United States Patent
Schustack

[11] 3,740,082
[45] June 19, 1973

[54] PIPE COUPLING

[76] Inventor: Edward H. Schustack, 2244 East 37th St., Los Angeles, Calif. 90058

[22] Filed: June 15, 1972

[21] Appl. No.: 263,263

[52] U.S. Cl. .............................. 285/342, 285/369
[51] Int. Cl. ............................................ F16l 21/04
[58] Field of Search ................. 285/337, 369, 342; 277/11

[56] References Cited
UNITED STATES PATENTS

| | | |
|---|---|---|
| 3,547,471 | 12/1970 | Dunmire ........................ 285/337 |
| 1,310,740 | 7/1919 | Coffey ........................... 285/342 |
| 2,288,904 | 7/1942 | Hudson .......................... 285/337 |
| 1,196,785 | 9/1916 | Johnson ......................... 285/342 |

Primary Examiner—Thomas F. Callaghan
Attorney—Ralph Hammar

[57] ABSTRACT

A sleeve type coupling for plain end pipe in which an axially extending surface coaxial with the follower cooperates with flexible tabs projecting outwardly from the gasket to center the follower on the outer surface of the pipe end and thereby minimize leakage.

3 Claims, 5 Drawing Figures

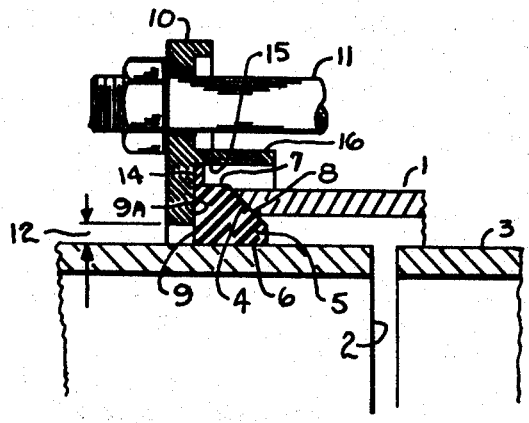
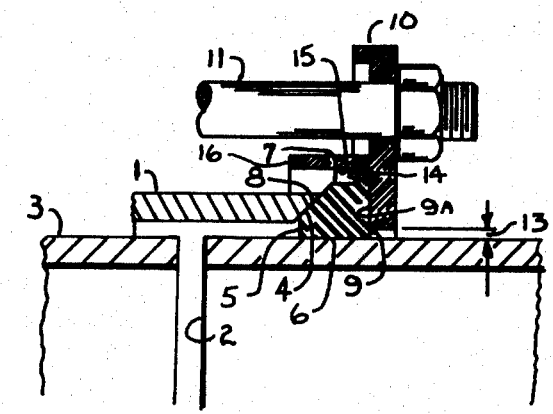
FIG. 1    FIG. 2
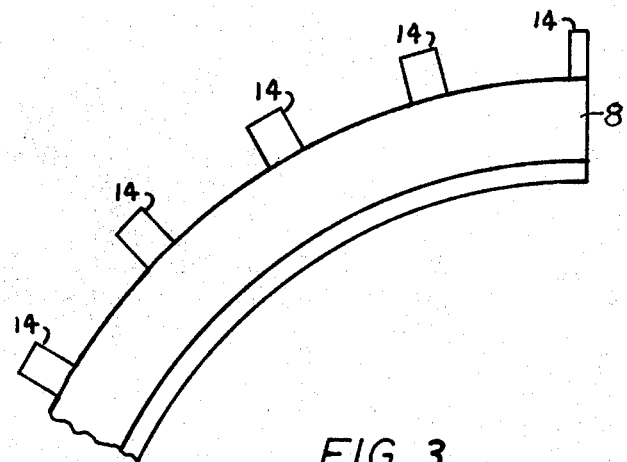
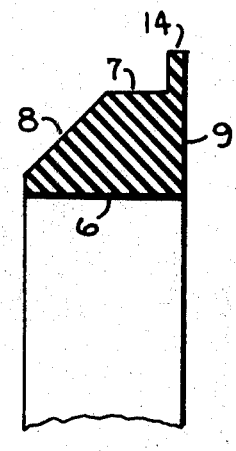
FIG. 3    FIG. 4
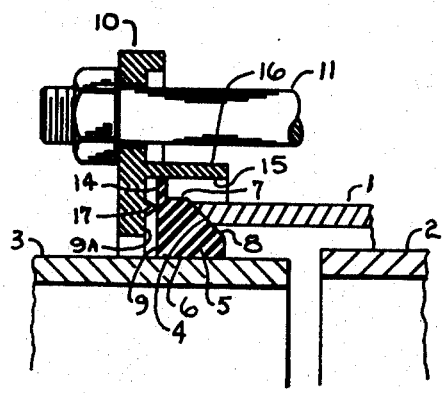
FIG. 5

PIPE COUPLING

This invention is intended to prevent leakage in sleeve type couplings due to variations in the outside diameter of the pipe. This is accomplished by centering the follower on the outer surface of the pipe end so as to obtain uniform sealing pressure.

Pipe is commonly made to a number of different pressure classes with corresponding different outside diameters. For example, 12 inch cast iron pipe for one common pressure class has an outside diameter of 13.20 inches and for another pressure class has an outside diameter of 13.50 inches. This coupling prepares the user to couple 13.20 inch O.D. to 13.20 inch O.D.; 13.50 inch O.D. to 13.50 inch O.D.; 13.20 inch O.D. to 13.50 inch O.D. and any and all outside diameters which fall within its design range.

In the drawing:

FIG. 1 is a fragmentary section through a coupling assembled on a pipe end of a minimum outside diameter, FIG. 2 is a similar section through the same coupling assembled on a pipe end of a maximum outside diameter, FIG. 3 is a fragmentary end view of the gasket, FIG. 4 is a cross section of the gasket in its uncompressed state, and FIG. 5 is a fragmentary section through a modification.

The coupling has a cylindrical sleeve 1 telescoped over adjoining plain pipe ends 2, 3 to be coupled. The ends of the sleeve are provided with inwardly extending inclined surfaces 4 which in cooperation with the outer surfaces of the pipe ends provide an annular recess of wedge shaped cross section in a plane including the axis of the sleeve. The seal between the outer surface of the pipe end and the inner surface of the sleeve is effected by an annular gasket 5 of suitable elastomer such as natural or synthetic rubber. In the uncompressed state, the gasket has cylindrical inner and outer surfaces 6 and 7, a tapered end surface 8 generally complementary to the wedge shaped recess between the sleeve and the adjoining pipe end and an abrupt outer end surface 9 engaging an annular surface 9a on a rigid follower 10. The gasket is squeezed between the follower 10 and the inclined surface 4 on the sleeve by bolt means 11, thereby causing the gasket to be compressed into sealing engagement with the outer surface of the pipe end and the inclined surface 4 on the sleeve.

In order to obtain uniform sealing pressure as the follower is tightened, it is necessary that the follower be centered on the outer surface of the pipe end. The outside diameter of pipe varies considerably. In FIG. 1 the spacing between the follower and the outer surface of the pipe end is indicated at 12 and in FIG. 2 the same spacing is indicated at 13. If the spacings 12 and 13 were uniform around the entire circumference of the pipe end, uniform sealing pressure would be obtained as the follower was tightened and leakage would be prevented. However, if the spacing at one point of the circumference of the pipe were as indicated at 13 and the spacing at a diametrically opposite point were as indicated at 12, the gasket sealing pressure would be non uniform and would be least at the spacing designated by the numeral 12 where leakage would occur. In order to prevent such leakage, the gasket is provided with a plurality of flexible tabs 14 projecting radially outward from the cylindrical surface 7 of the gasket. These tabs are angularly spaced from each other as shown in FIG. 3 and have sufficient rigidity to cooperate with a concentric cylindrical surface 15 on an axially extending flange 16 integral with the follower to center the follower on the outer surface of the pipe end as the follower is telescoped over the gasket in its initial position ready for tightening. For pipe ends which have the smallest outside diameter such as indicated at FIG. 1, the tabs 14 will occupy a substantially radial position before tightening. For pipe ends of maximum outside diameter such as indicated at FIG. 2, the tabs 14 will be bent over. In both cases, the tabs will center the follower on the outer surface of the pipe end. As the gasket is moved into place on the pipe end, the gasket is stretched so that its inner surface 6 is in direct contact with the outer surface of the pipe end. The inner surface 6 of the gasket accordingly provides a reference from which the centering effect of the tabs 14 is effective. By starting the follower in a position centered on the outer surface of the pipe end, the tightening of the follower results in uniform compression of the gasket and, therefore, uniform sealing pressure.

The radially projecting tabs 14 on the gasket initially center the follower by direct action between the outer surface of the pipe end and the surface 15 concentric with the pressure surface 9a of the follower. The centering force from the tabs is efficiently applied. The force from the tabs is large enough to initially center the follower and does not interfere with the much larger clamping forces as the follower is tightened.

In FIG. 5 is shown a modification which adds a projection 17 on the follower which during the initial tightening of the follower becomes embedded in the gasket and thereby prevents or minimizes radially outward flow of the gasket as the follower is tightened. The projection 17 may take the form of a singular annular bead concentric with the axis of the follower or it may comprise several projections which become embedded in the gasket as the follower is tightened. The purpose of the projections is to prevent loss of concentricity of the gasket and the outer surface of the pipe end as the follower is tightened. The projection 17 can have a wedge shaped inner surface which tends to crowd the gasket into the recess between the pipe and sleeve.

What is claimed is:

1. In a coupling of the type having a cylindrical sleeve with an inside diameter large enough to receive adjacent ends of plain end pipe, an end surface of the sleeve being inclined radially inward to form with the outer surface of a pipe end an annular recess of wedge shaped cross section in a plane including the axis of the sleeve, an annular elastomeric gasket having in its uncompressed state an inner cylindrical surface engaging the outer surface of the pipe end and an outer annular surface extending outward from the adjacent end of the sleeve, said gasket being stretchable to accommodate variations in outside diameter of the pipe end, the end of the gasket adjacent the sleeve being tapered so as to be generally complementary to said wedge shaped recess and the end of the gasket remote from the sleeve being abrupt, a follower having an inner surface engaging the abrupt outer end of the gasket, and bolt means for forcing the follower toward the sleeve to compress the gasket into sealing engagement with the sleeve and pipe end, the improvement which comprises an axially projecting flange on the follower having a coaxial inner surface spaced radially outward from and extending over the outer annular surface of the gasket, and said gasket in its uncompressed state having a plurality of angularly spaced flexible tabs projecting radially outward from the outer surface of the gasket into engagement with said coaxial surface of the follower to center the follower on the outer surface of the pipe and thereby provide uniform sealing around the pipe end.

2. The coupling of claim 1 in which the gasket engaging surface of the follower has projection means engaging the abrupt outer end of the gasket and becoming embedded in the gasket as the follower is tightened for holding the gasket concentric with the outer surface of the pipe end as the follower is tightened.

3. The coupling of claim 2 in which the projection means comprises an annular rib concentric with the axis of the follower.

* * * * *